Feb. 27, 1968   A. T. THOMAS ET AL   3,371,170
MANUAL DRIVE MEANS FOR A TIMER SHAFT
Filed Nov. 1, 1965

INVENTORS
ALLAN T. THOMAS
BOUDEWYN F. GEVAERT
BY
Robert Levine
ATTORNEY

United States Patent Office 3,371,170
Patented Feb. 27, 1968

3,371,170
MANUAL DRIVE MEANS FOR A TIMER SHAFT
Allan T. Thomas and Boudewyn F. Gevaert, Downsview, Ontario, Canada, assignors to Johnson, Matthey and Mallory, Ltd., Toronto, Ontario, Canada, a corporation of Canada
Filed Nov. 1, 1965, Ser. No. 505,906
10 Claims. (Cl. 200—38)

ABSTRACT OF THE DISCLOSURE

A manual drive means for a timer shaft including an axially depressible control knob, a rotatably displaceable hub means and a means for coupling the hub means to the timer shaft. The hub means is carried by the housing and is restrained against axial displacement by the housing. The control knob and the hub means include a plurality of extending means which engage upon depression of the control knob to form a clutch means. The depressed knob means is locked with the hub means when displaced in one direction and is free-wheeling of the hub means when displaced in another direction. Means coupling the hub means to the shaft so that rotational displacement of the axially depressed knob means in the one direction is transferred through the clutch to the shaft so as to rotationally displace the shaft.

---

This invention relates generally to a timer switch assembly for sequential timers, and more particularly to a means and method for manually indexing an axially movable cam carrying shaft of a sequential timer.

Although the present invention is adaptable to a multiplicity of uses, a particular useful application of the means and method of the invention is found in sequential timers of the type employed to regulate cycle programs of electrical appliances such as washing machines, dishwashers, dryers, and the like. Generally, the sequential timers utilized to control the sequence of operations of the cooperatively associated electric appliances are of the type having a plurality of cams attached to a rotatably driven shaft. The cams have coded indicia, generally rise and fall peripheral contours, on which one or more follower switches ride. The state of actuation of any particular follower switch is determined by the contours of the cam cooperatively associated with the follower switch. Each follower switch effectively controls the state of actuation of an electrical circuit associated therewith. Such electrical circuits control the cycling of the electrical appliance which, for example, in a washing machine would be the washing, the rinsing, and the drying portions of the cycle program. The occasions do arise when the operator of the electric appliances desires to alter the time duration of a particular portion of the timed cycle program. To perform this function, the electric appliance is usually equipped with a control knob that is manually rotated so as to rotate the cam shaft to thereby advance the cams to a desired circumferential position so that the portion of the timed cycle desired is programmed by the cams. Generally, the follower switches are of the type that may be damaged to the extent that they may be inoperative for their intended purpose if the cam carrying shaft was rotated when the follower switches had an electrical current flowing therethrough or when the cam carrying shaft was displaced in the wrong direction. The existence of either or both of the aforementioned conditions would damage the sequential timer if allowed to exist.

The present invention contemplates the use of a novel timer switch assembly, hereinafter referred to as a manual drive means, which allows the cam carrying shaft to be manually displaced only under a condition where the cam follower switches are under no electrical load. Also, the present invention includes means for preventing inadvertent reverse rotation of the cam carrying shaft.

Therefore, it is an object of the present invention to provide a manual drive means for a sequential timer which means is so constructed that manual rotation of a cam carrying shaft will cause the sequential timer to deenergize.

Another object of the present invention is to provide a novel manual drive means for a sequential timer which means is so constructed so as to prevent a wrong direction manual rotation of the cam carrying shaft.

Still another object of the present invention is to provide a novel manual drive means for a sequential timer which means is relatively small thereby occupying a minimum amount of space in the housing of an electrical appliance.

Yet another object of the present invention is to provide a manual drive means for a sequential timer which means is characterized by its simplicity.

Another object of the present invention is to provide a manual drive means for a sequential timer which means includes an improved construction of a knob for manually controlling the time duration of a programmed cycle of an electric appliance.

Yet still another object of the present invention is to provide a manual drive means including a control knob for electric appliances which is entirely self-contained without depending upon any special construction of an electric switch to operate the appliance.

Yet another object of the present invention is to provide an efficient, effective, and accurate manual drive means.

Still another object of the present invention is to provide a manual drive means which can be readily fabricated and formed at low cost.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement, and cooperation of elements as hereinafter described and more particularly as defined in the appended claims.

The appended drawings illustrate an embodiment of the present invention constructed to function in the most advantageous modes devised for the practical application of the basic principles involved in the hereinafter described invention.

Generally speaking, the means and methods of the present invention relate to a manual drive means for an axially depressable shaft. The manual drive means includes a control knob means that has a post. The post includes a plurality of longitudinally extending means. A means is utilized for coupling the control knob means to the shaft so that the control knob has a floating rotational characteristic on the shaft. A hub means is carried on the shaft and the hub means includes a plurality of longitudinally extending means. The longitudinally extending means of the control knob interengages with the longitudinally extending means of the hub means when the control knob means and the shaft are axially depressed thereby forming a one-way clutch means. A means projects from the shaft for coupling the hub means to the shaft so that rotational displacement of the axially depressed control knob means is transferred through the one-way clutch to the shaft so as to rotationally displace the shaft.

More particularly, the present invention relates to a timer for sequentially engaging and disengaging a plurality of follower switches at selected intervals of time during a programmed cycle. A drive means having a rotary motion output is coupled to and rotatably drives an axially depressable shaft. The axially depressable shaft carries a plurality of cam means that has peripheral coded indicia. A plurality of follower switch means is cooperatively associated with the coded indicia of the cam means. The coded indicia is utilized for sequentially engaging and disengaging the follower switches at selected intervals of time. A normally closed line switch means is cooperatively associated with the shaft. The line switch means is opened when the shaft is axially depressed so as to deenergize the timer. A manual drive means for the shaft includes a control knob means that has a post. The post includes a plurality of longitudinally extending saw-tooth shaped teeth. A means is used to couple the control knob means to the shaft so that the control knob has a floating rotational characteristic on the shaft. A hub means is carried on the shaft. The hub means includes a plurality of longitudinally extending saw-tooth shaped teeth. When the control knob means and the shaft are axially displaced, the teeth of the control knob and the teeth of the hub means interengage thereby forming a one-way clutch means. A pin projects from the shaft for coupling the hub means to the shaft so that rotational displacement of the axially depressed control knob means is transferred through the one-way clutch to the shaft so as to rotationally displace the shaft in a predetermined direction.

Figure 1:
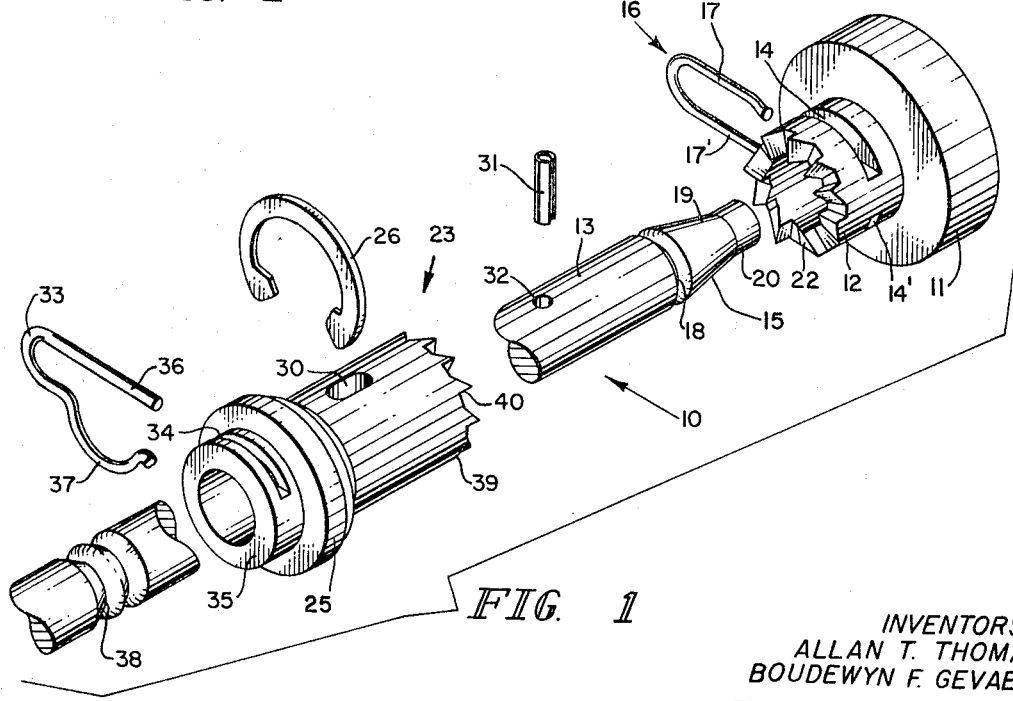
FIGURE 1 is a perspective view of the manual drive means illustrating the several components thereof.

Referring now to FIGURE 1 of the drawings, the manual drive means 10 of the present invention is shown in an exploded perspective view. A control knob means 11 includes an axial post 12, which is tubular and has provision to be axially connected to cam carrying shaft 13. The tubular post has a pair of split D grooves 14 and 14' formed therein. The pair of split D grooves of the tubular post overlay a circumferential groove 18 formed in extremity 15 of the cam carrying shaft. A substantially U-shaped hairpin spring 16 has spring fingers 17 and 17' that interfit respectively with D-shaped groove 14 and D-shaped groove 14' of the axial post of the control knob. The spring fingers 17 and 17' ride in the circumferential groove 18 of the cam carrying shaft. It will be noted that rotational displacement of the control knob will cause the pair of split D grooves to engage with the corresponding spring fingers of the U-shaped hairpin spring means so as to rotationally displace the hairpin spring means through an arcuate displacement that corresponds to the arcuate displacement of the control knob. However, the U-shaped hairpin spring slides in the circumferential groove without arcuately displacing the cam carrying shaft. The U-shaped hairpin spring does not engage the cam carrying shaft with sufficient torque to overcome the inertia of the cam carrying shaft. Inward axial displacement or depression of the control knob will cause the split D grooves of the control knob to engage with the spring fingers of the U-shaped hairpin spring. The spring fingers engage with the side wall of the circumferential groove 18 and further inward axial displacement or depression of the control knob causes the spring fingers to engage with and thereby displace the cam carrying shaft inwardly.

Figures 2, 3:
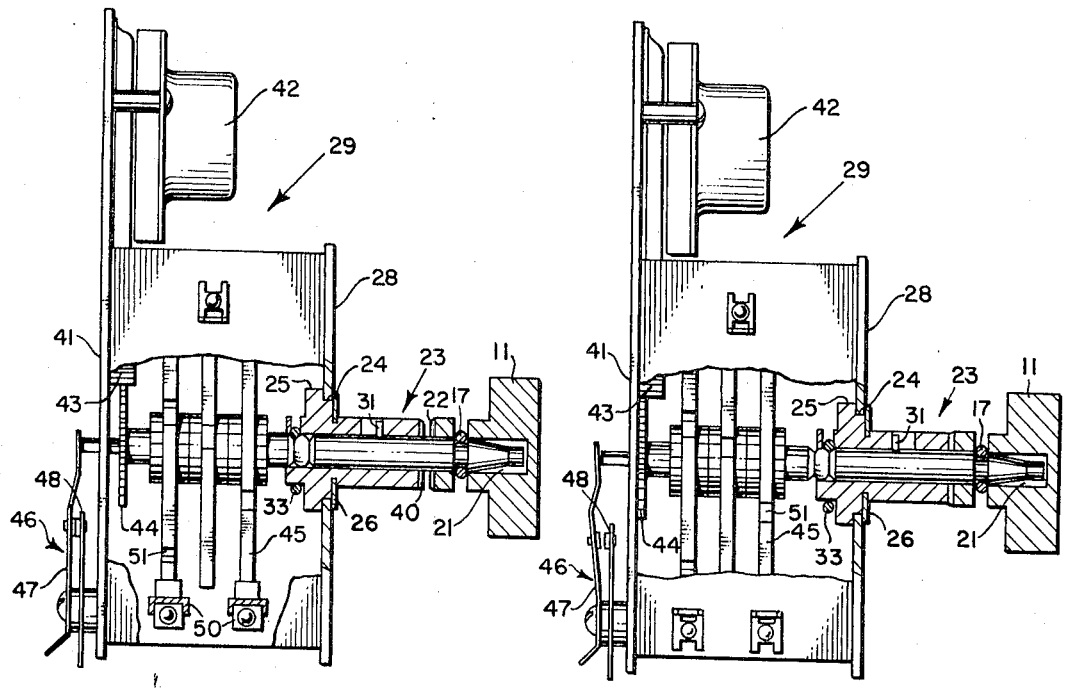
FIGURE 2 is a partial side view of a sequential timer illustrating the manual drive means in its normal position.
FIGURE 3 is a partial side view of the sequential timer showing the manual drive means engaged with a cam carrying shaft so that manual displacement of the control knob will also manually displace the cam carrying shaft.

The extremity 15 of the cam carrying shaft includes a frustum of a cone-shaped portion 19 and a cylindrical tip portion 20. As illustrated in FIGURES 2 and 3, the frustum of a cone-shaped portion and the cylindrical tip portion of extremity 15 of the cam carrying shaft interfit with the tubular portion of the post and a recess 21 of the control knob. It will be noted that the tubular post and the control knob are integral and are fabricated from any suitable rigid plastic or metal such as steel or the like.

The extremity of the tubular post 12 has formed therein a plurality of longitudinally extending saw-tooth shaped teeth 22 whose purpose and function will be more fully disclosed herein later.

A hub means 23 is axially retained within aperture 24 of front wall 28 of the sequential timer means 29 by shoulder 25 of the hub means and a C-ring 26 that interfits in a circumferential groove 27 of the hub means. The axial retention of the hub means within the aperture 24 does not inhibit the ability of the hub means to be rotationally displaced within the aperture. A longitudinal slot 30 of predetermined length is cut into the hub means. A pin 31 interfits with the longitudinal slot in such a manner that the pin engages the side walls of the slot when rotationally displaced, but slides within the slot when the pin is displaced toward or away from the front wall of the sequential timer. FIGURES 2 and 3 show that the pin is fixedly retained by the cam carrying shaft. FIGURE 1 illustrates that the pin is press fitted with recess 32 of the cam carrying shaft such that the pin is substantially perpendicular to the longitudinal axis of the cam carrying shaft and projects beyond the surface thereof a sufficient distance so as to engage with slot 30 in the hub means.

The hub means 23 provides a forward support for the cam carrying shaft. The hub means also includes B-shaped hairpin spring means 33 for axially positioning the cam carrying shaft. The B-shaped airpin spring means is retained in position by a D-shaped slot 34 in extremity 35 of the hub means. A resilient finger 36 of the B-shaped hairpin spring means is retained in the D-shaped slot in a plane that is perpendicular to the longitudinal axis of the cam carrying shaft. Resilient finger 336 of the B-shaped hairpin spring frictionally engages with the outer periphery of the hub means. Finger 36 of the B-shaped hairpin spring engages with one of the plurality of circumferential grooves 38 cut in the periphery of the cam carrying shaft. The finger 36 is biased against the shaft thereby maintaining the shaft in a desired axial position. To alter the axial position of the cam carrying shaft, the shaft is pushed in or pulled out, depending on the desired result or the initial axial position of the shaft, to thereby alter or change the axial position of the shaft. The hairpin spring 33 thus positively holds the cam carrying shaft in the depressed or inner position or the outer or normal position, and yields to permit the cam carrying shaft to be actuated from one of a plurality of axial positions to another of a plurality of axial positions.

Extremity 39 of the hub means includes a plurality of longitudinally extending and circumferentially spaced saw-tooth shaped teeth 40. The teeth 40 are so disposed as to interengage with teeth 22 when the cam carrying shaft 13 is displaced axially inward to thereby form a positive jaw clutch. The interengagement of the teeth is illustrated in FIGURE 3 of the drawings. The teeth 22 and the teeth 40 may be disengaged by pulling outwardly on the control knob. The disengaged position of the teeth 22 and of the teeth 40 is illustrated in FIGURE 2.

As illustrated in FIGURES 2 and 3, the cam carrying shaft is rotatably journalled in hub means 23 and rear wall 41 of the sequential timer. The cam carrying shaft projects a predetermined distance beyond the rear wall, the reason for which will be disclosed hereinlater.

The rear wall 41 serves as the main mounting means for the drive means of the sequential timer. Typically, the timer includes a drive motor means 42 which is mechanically coupled to a pinion (not shown) for rotationally displacing the pinion in a predetermined direction, such as the clockwise direction, with a substantially continuous rotary motion. Motor 42 is fixedly secured to the rear wall by a plurality of suitable mounting means such as bolts, rivets or the like. The mounting means prevent deleterious horizontal and vertical displacement of the motor due to vibration, abusive handling or the like. The mounting means predeterminately locate the pinion (not shown) with respect to a drive gear (not shown) of an escapement means (not shown). The gear meshes with and is driven by the pinion in a counterclockwise direction with a substantially constant rotary motion. The escapement means translates the substantially constant rotary motion output of the motor to an intermittent or step-by-step rotary motion output. The constructional details of the drive means of the sequential timer have been held to but a minimum since these aforementioned components are standard.

The intermittent motion of the escapement means is transferred to pinion 43 retained on the rear wall. The pinion 43 meshes with and intermittently drives a gear 44 fixedly coupled to the cam carrying shaft.

Mounted in spaced, parallel relationship on the cam carrying shaft is a plurality of cam means 45. The shaft projects through the longitudinal axis of each of the individual cams in such a manner that each of the cams is fixedly coupled to and rotatable with the cam carrying shaft. The cam means are each fabricated from any suitable rigid and electrically nonconductive material such as Bakelite or the like.

Each of the respective cams 16 has on the periphery thereof a cam track including coded indicia such as rise and fall contours 51. Each peripheral cam track includes coded indicia or rise and fall contours which are utilized to displace a follower switch means 50 riding thereon to one of a plurality of predetermined positions. The position of an individual follower switch is dependent on the particular portion of the cam's contour on which the follower arm (not shown) of the follower switch is riding. Generally, the follower switch cooperatively associated with the contoured periphery of a cam is located juxtaposition the periphery of the cam as illustrated in FIGURE 2. As the shaft is intermittently rotated by the action of the escapement means, the follower switch is displaced by the contours on the periphery of the cooperatively associated cam.

A suitable line switch means 46 is utilized to actuate the sequential timer. Any one of several different types of line switch means may be utilized. One suitable type of line switch means is illustrated in FIGURES 2 and 3. The line switch means illustrated in FIGURE 3 has a movable contact carrying blade 47 biased out of engagement with a fixed contact carrying blade 48 by the projecting extremity of the cam carrying shaft. The disengagement of the contacts of the contact carrying blades "opens" an electrical circuit between the sequential timer and an electrical source (not shown) when the cam carrying shaft is axially positioned as shown in FIGURE 3, hereinafter referred to as the first axial position. When the shaft is in the second axial position as shown in FIGURE 2, hereinafter referred to as the "normal" position, the cam carrying shaft no longer biases the movable contact carrying blade out of engagement with the fixed contact carrying blade. The resilient action of the movable contact carrying blade allows the contacts to engage when the cam carrying shaft is in the normal position. Upon engagement of the contacts of the contact carrying blades, an electrical circuit between the sequential timer and the electrical source is closed thereby energizing the sequential timer. It is emphasized that the disclosed line switch means is only one of the several different types of line switch means that could be used in cooperative association with the cam carrying shaft.

With the hereinbefore structural disclosure in mind and by continued reference to the several figures of the drawing, the following analysis of operation of the present invention will further serve to amplify the novelty of the present invention.

Assuming that the operator desires to vary a particular portion of a cycle of a device such as a washing machine, the control knob is displaced axially inwardly thereby axially displacing the cam carrying shaft inwardly through substantially the same axial distance. Continued inward axial displacement of the control knob causes spring finger 36 of the B-shaped hairpin spring to ramp up one of the circumferential grooves 38 on the cam carrying shaft until the finger reaches the apex of the circumferential groove at which time the resilient spring finger slides down the slope of the adjacent circumferential groove thereby frictionally locking the cam carrying shaft in a predetermined axial position as shown in FIGURE 3. The axial displacement of the cam carrying shaft causes the extremity of the shaft projecting through the rear wall 41 of the sequential timer to bias the line switch means to an electrically nonconducting or "open" position. When the line switch is biased to an "open" position, the sequential timer is deenergized.

As illustrated in FIGURE 3, the saw-tooth shaped teeth 22 of the control knob engage with the saw-tooth shaped teeth 40 of the hub means in a complementary fashion. It is seen that the shape of the engaging teeth is such that when the control knob is rotationally displaced in the clockwise direction, the outer faces of the teeth engage and rotationally displace the cam carrying shaft through the hub means. However, if the control knob should be turned in the counterclockwise direction by mistake or inadvertence, the ramped portion of the saw-tooth shaped teeth of the control knob would ride up the ramped portion of saw-tooth shaped teeth of the hub means, thereby disengaging the control knob from the hub means and allowing teeth 22 to ride free from teeth 40. It is seen that the cam carrying shaft would not be rotationally displaced by the counterclockwise displacement of the control knob. In the embodiment illustrated, the normal direction of rotating the cam carrying shaft is in the clockwise direction, but if the control knob should be inadvertently rotated in a counterclockwise direction, the shaft would not be rotated in that direction and therefore any potential danger of damage to the electric appliance and/or to the sequential timer would be avoided.

As disclosed hereinbefore, the hub means is journalled to front wall 28 of the sequential timer. The pin 31 fixedly coupled to the cam carrying shaft rides in slot 30 of the hub means. It is seen that axial displacement of the pin does not axially displace the hub means whereas rotational displacement of the hub means by the rotational displacement of the control knob causes the appropriate side wall of the slot to engage with the pin thereby rotationally displacing the cam carrying shaft in accordance with the rotational displacement of the hub means.

Having selected the desired time interval of the wash cycle, the control knob is pulled axially outwardly thereby allowing the line switch to assume an engaged position thereby energizing the sequential timer.

Suitable means may be used for applying indicia to the surface of the control knob and coacting indicia may be provided on the sequential timer. The shape and character of the control knob may be varied, as desired, but it should be so shaped as to provide a means for secure grasping thereof so as to turn the cam shaft easily and in the proper direction.

While the invention is illustrated and described in an embodiment, it will be understood that modifications and variations may be effected without departing from the scope of the novel concepts of this invention and as set forth in the appended claims.

Having thus described my invention, we claim:

1. A manual drive means comprising a housing having a front wall, a shaft, an axially depressible control knob means including a plurality of extending means carried by said shaft, means coupling said control knob to said shaft so that said control knob has a floating characteristic on said shaft, a rotatably displaceable hub means carried by the housing of said drive means, means carried by said hub means securely locking said hub means to said front wall of said housing to prevent axially displacement of said hub means, said hub means including a plurality of extending means, said extending means of said knob means engaging with said extending means of said hub means forming a clutch means when said knob means is axially depressed, said depressed knob means substantially locked with said hub means when displaced in one direction and said depressed knob means being substantially free-wheeling of said hub means when displaced in another direction, means coupling said hub means to said shaft so that rotational displacement of said axially depressed knob means in said one direction is transferred through said clutch means to said shaft so as to rotationally displace said shaft.

2. A manual drive means for a shaft as claimed in claim 1, wherein said extending means of said control knob means includes saw-tooth shaped teeth and said extending means of said hub means includes saw-tooth shaped teeth, said teeth of said control knob means interengaging with said teeth of said hub means when said control knob means is axially depressed thereby forming a clutch means.

3. A manual drive means for a shaft as claimed in claim 1, wherein said means coupling said hub means to said shaft includes a pin, said hub means includes a slot with which said pin interfits.

4. A manual drive means for a shaft as claimed in claim 1, wherein said hub means is axially apertured and said shaft projects through said axial aperture of said hub means, said shaft being axially slidable with respect to said hub means.

5. A timer for sequentially engaging and disengaging a plurality of follower switches at selected intervals of time during a programmed cycle comprising a housing having a front wall, a motorized drive means having an output, an axially depressible shaft carrying a plurality of cam means including coded indicia, said shaft coupled to and driven by said drive means, a plurality of switch means cooperatively associated with said coded indicia of said cam means, said coded indicia for sequentially engaging and disengaging said switches at selected intervals of time, and a manual drive means for driving said shaft independent of said motorized drive means, said manual drive means comprising an axially depressible control knob means including a plurality of extending means, a rotatably displaceable hub means carried by the housing of said timer, means carried by said hub means securely locking said hub means to said front wall of said housing to prevent axial displacement of said hub means, said hub means including a plurality of extending means, said extending means of said knob means engaging with said extending means of said hub means forming a clutch means when said knob means is axially depressed, said depressed knob means substantially locked with said hub means when displaced in one direction and said depressed knob means being substantially free-wheeling of said hub means when displaced in another direction, means coupling said hub means to said shaft so that rotational displacement of said axially depressed knob means in said one direction is transferred through said clutch means to said shaft so as to rotationally displace said shaft.

6. A timer as claimed in claim 5, wherein said extending means of said control knob means includes saw-tooth shaped teeth and said extending means of said hub means includes saw-tooth shaped teeth, said teeth of said control knob means interengaging with said teeth of said hub means when said control knob means is axially depressed thereby forming said clutch means.

7. A timer as claimed in claim 5, including means for coupling said control knob to said shaft so that said control knob has a floating characteristic on said shaft.

8. A timer as claimed in claim 5, wherein said means coupling said hub means to said shaft includes a pin, said hub means includes a slot with which said pin interfits.

9. A timer as claimed in claim 5, wherein said hub means is axially apertured and said shaft projects through said axial aperture of said hub means, said shaft being axially slidable with respect to said hub means.

10. A timer as claimed in claim 5, including a normally closed line switch cooperatively associated with said shaft, said line switch means opened by engagement with an extremity of said shaft when said shaft is axially depressed so as to de-energize said timer.

References Cited

UNITED STATES PATENTS

| | | | |
|---|---|---|---|
| 2,825,772 | 3/1958 | Jones | 200—37 |
| 3,190,418 | 6/1965 | Woolley | 192—67 |
| 3,319,144 | 5/1967 | Clark | 200—38 XR |

FOREIGN PATENTS 288,509   11/1915   Germany.

BERNARD A. GILHEANY, *Primary Examiner.*

H. SPRINGBORN, R. L. COHRS,
*Assistant Examiners.*